(12) United States Patent
Weber

(10) Patent No.: US 6,691,858 B2
(45) Date of Patent: Feb. 17, 2004

(54) CONVEYOR SYSTEM

(75) Inventor: Guenther Weber, Neubrandenburg (DE)

(73) Assignee: Weber Maschinenbau GmbH & Co. KG, Breidenbach (DE)

( * ) Notice: Subject to any disclaimer, the term of this patent is extended or adjusted under 35 U.S.C. 154(b) by 43 days.

(21) Appl. No.: 10/149,145

(22) PCT Filed: Dec. 13, 2000

(86) PCT No.: PCT/EP00/12675
§ 371 (c)(1),
(2), (4) Date: Oct. 9, 2002

(87) PCT Pub. No.: WO01/47793
PCT Pub. Date: Jul. 5, 2001

(65) Prior Publication Data
US 2003/0057059 A1 Mar. 27, 2003

(30) Foreign Application Priority Data
Dec. 28, 1999 (DE) .......................................... 199 63 398

(51) Int. Cl.[7] .............................................. B65G 47/30
(52) U.S. Cl. ...................................... 198/456; 198/436
(58) Field of Search ................................... 198/456, 436

(56) References Cited
U.S. PATENT DOCUMENTS

| | | | | |
|---|---|---|---|---|
| 3,159,266 A | * | 12/1964 | Rapparlie | 198/456 |
| 3,203,333 A | * | 8/1965 | Skiba et al. | 198/456 |
| 4,598,902 A | * | 7/1986 | Schneider et al. | 271/205 |
| 4,684,008 A | * | 8/1987 | Hayashi et al. | 198/436 |
| 4,771,876 A | * | 9/1988 | Bandixen | 198/367 |
| RE33,511 E | * | 1/1991 | Treiber | 198/456 |
| 5,174,430 A | | 12/1992 | Ebira | |
| 5,186,306 A | * | 2/1993 | Sjostrand | 198/442 |
| 5,188,210 A | * | 2/1993 | Malow | 198/369 |
| 5,209,339 A | | 5/1993 | Antonissen | |
| 5,441,142 A | * | 8/1995 | Schneider | 198/492 |
| 5,944,165 A | | 8/1999 | Mannlein et al. | |
| 5,984,301 A | * | 11/1999 | Holbert et al. | 198/456 |
| 6,152,284 A | * | 11/2000 | Sandberg et al. | 198/432 |

FOREIGN PATENT DOCUMENTS

| | | |
|---|---|---|
| DE | 274600 A1 | 12/1989 |
| DE | 4429327 C2 | 2/1996 |
| DE | 19617187 A1 | 10/1997 |
| DE | 19713813 C1 | 10/1998 |
| EP | 0274229 A2 | 7/1988 |

* cited by examiner

Primary Examiner—Douglas Hess

(57) ABSTRACT

A conveyor system for transporting at least one linear entry stream of a product into exit streams of the product which are laterally offset in relation to the entry stream. The conveyor system is provided with two successive conveyor units whose adjacent downstream or upstream ends can be displaced in opposite directions in relation to each other transversely to the direction of transport.

9 Claims, 2 Drawing Sheets

CONVEYOR SYSTEM

Figure 1A:
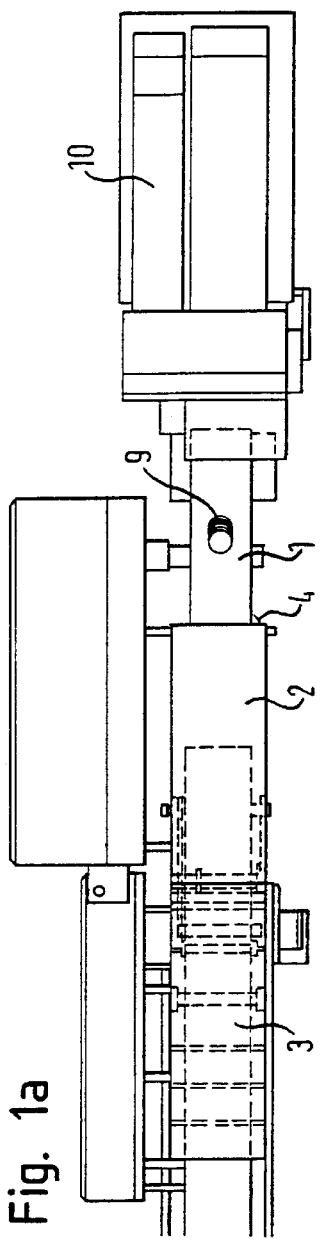

The invention relates to a conveyor system for the transferring of at least one linear inlet stream of food products such as sausage, ham, cheese and the like successively sliced at high speed, and preferably stacked, into at least one outlet stream, which is laterally offset with respect to the inlet stream, while using a plurality of conveyor units arranged in series and each serving as a product support.

Conveyor systems of this kind are generally known, for example from U.S. Pat. No. 5,209,339, and are in practical use in large numbers. A distribution apparatus is known from U.S. Pat. No. 5,944,165 having a continuous product support and adjustable lateral guides with which products to be distributed are displaced relative to the product support on the continuous product support with a component transverse to the conveyor direction. EP 0 274 229 A2 describes a conveyor system in which the products are transferred from a conveyor having a stationary upstream end, whose downstream end is movable transversely to the conveyor direction, to a following conveyor of larger width.

It is the object of the present invention to substantially increase the operating speed, and thus the capacity of the conveyor system. It should moreover be achieved that, where possible, no forces which impair and/or change the stack shape act on the conveyed products or product stacks during the conveyor process.

This object is satisfied in accordance with the invention by the features of claim 1 and substantially by a one part or multi-part first conveyor unit for the reception of the products sliced by means of a slicer, by a second conveyor unit adjoining it which has a larger width in comparison with the first conveyor unit and whose upstream product support end is movable and pivotable transversely to the conveyor direction and relative to the downstream product support end of the first conveyor unit, and by a third conveyor unit which is arranged adjoining the stationary downstream product support end of the second conveyor unit.

A particularly advantageous embodiment of the invention is characterized in that the first conveyor unit consists of two successive part conveyor units, with both the downstream product support end of the downstream second part conveyor unit and the adjoining upstream product support end of the second part conveyor unit being made movable or pivotable transversely to the conveyor direction.

In accordance with a further embodiment of the invention, it is provided that two successive part conveyor units are provided, with the upstream part conveyor unit being a part of the first conveyor unit and the downstream part conveyor unit forming the second conveyor unit, and with both the downstream product support end of the first part conveyor unit and the adjoining upstream product support end of the second part conveyor unit being made movable or pivotable transversely to the conveyor direction.

It is possible to pivot the individual part conveyor unit at low speed due to the interplay of these two part conveyor units and to their pivoting in opposite senses, since the pivot movements in opposite senses add up with respect to the desired product offset so that an increase in the operating speed is nevertheless possible, on the one hand, and irritating transverse accelerations on the products are avoided, on the other hand.

Further advantageous aspects of the invention are specified in the dependent claims.

Figure 1B:
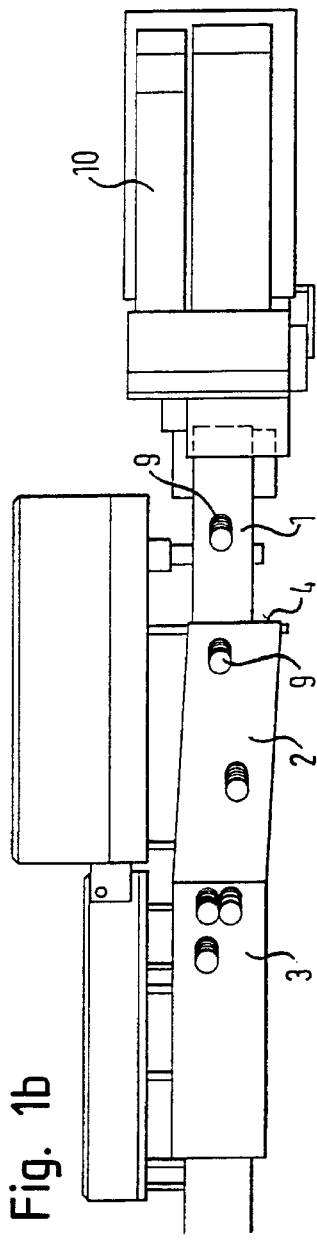
Figure 1C:
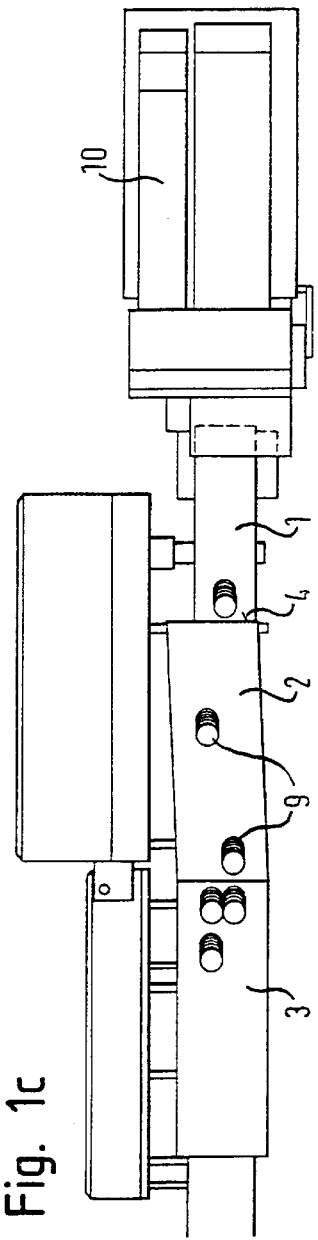
Figure 2A:
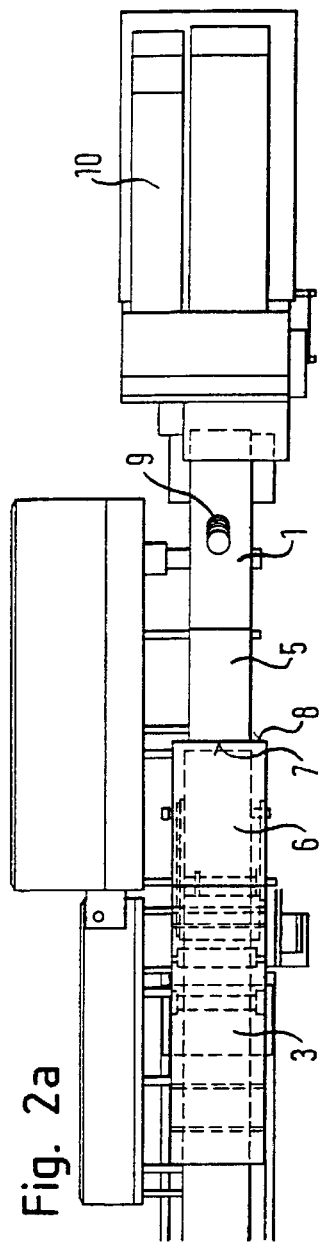
Figure 2B:
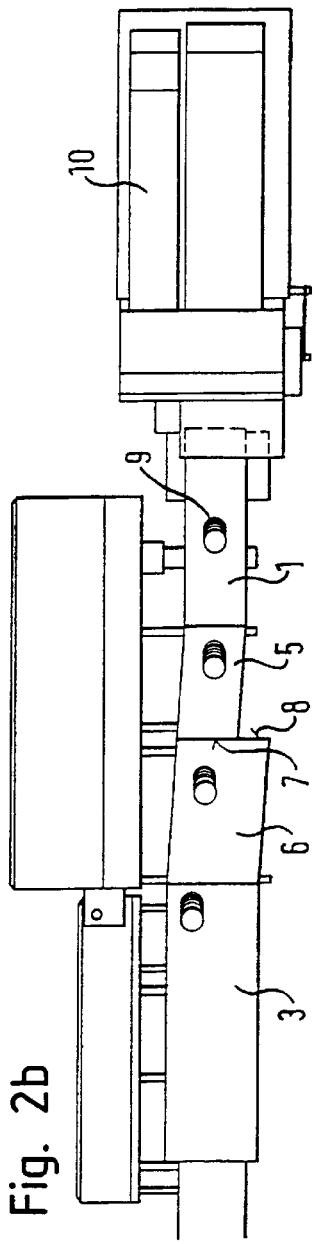
Figure 2C:
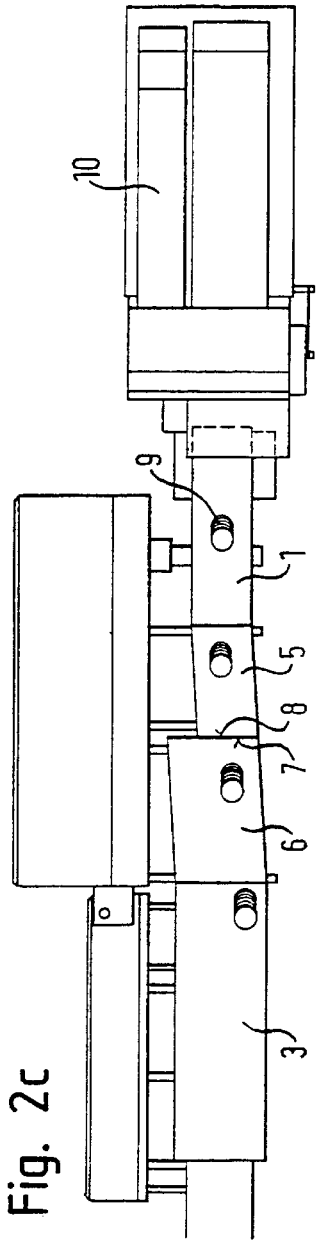

Embodiments of the invention will be explained with reference to the drawing; there are shown in the drawing:

FIGS. 1a to 1c schematic plan views of a conveyor system in different operating conditions; and FIGS. 2a to 2c a second preferred embodiment of the invention in the form of plan views of a conveyor system at different operating times.

FIG. 1 shows a slicer, in particular a slicer for the slicing of food products, with a high or very high slice sequence.

A first conveyor unit 1 is disposed after the slicer 10, with associated portion forming unit, for the transporting away of the sliced products, e.g. in the form of stacks 9, and for the transferring of these products on to a subsequent second conveyor unit.

An arrangement is shown in the drawing in which successive product stacks 9 are formed; however, it is also possible to work with a slicer 10 by means of which at least two products can be sliced in parallel and, accordingly, parallel product streams also arise.

A second conveyor unit 2 follows the first conveyor unit 1 and is made wider than the first conveyor unit 1 transversely to the conveyor direction and its upstream end 4 is made movable or pivotable transversely to the conveyor direction. This second conveyor unit 2 is followed by a third conveyor unit 3 which directly adjoins the stationary downstream end of the second conveyor unit and on which outlet product streams can be produced directly in dependence on the controlling of the pivotable upstream end 4 of the second conveyor unit 2.

In the embodiment shown, the serially supplied product stacks 9 are positioned pair-wise next to one another on the third conveyor unit 3 in accordance with FIGS. 1b and 1c which show the upstream end 4 of the second conveyor unit 2 in the two possible extreme positions.

FIGS. 2a to 2c show a preferred embodiment of the invention which differs from the conveyor system described above in that the second conveyor unit has been replaced by two part conveyor units 5, 6, with the upstream part conveyor unit 5 having a lower width than the following part conveyor unit 6 and both the downstream end 7 of this first part conveyor unit and the directly adjoining upstream end 8 of the second part conveyor unit 6 being made movable and/or pivotable transversely to the conveyor direction and in opposite senses to one another.

To achieve a lateral offset of a product stack 9 during the conveyor process, the downstream end 7 of the first part conveyor unit and the upstream end 8 of the second part conveyor unit 6 are moved in opposite senses to one another, with these paths being added with respect to the product offset. As a consequence of this, an increase in the operating speed of the total system can be achieved, on the one hand, and it can be ensured, on the other hand, that the lateral forces acting on the product stacks 9 are kept low, since the individual movements of the part conveyor units 5, 6 can be kept lower due to the speed addition than would be possible without the presence of such part conveyor units.

The individual conveyor units are preferably designed as so-called multi-element strip conveyors which are generally known. The transverse movements of the respective ends of the conveyor units can be ramp controlled so that start and end of a transverse movement do not take place abruptly.

What is claimed is:

1. A conveyor system for transferring at least one linear inlet stream of food products successively sliced at high speed into at least one outlet stream, which is laterally offset with respect to the inlet stream, while using a plurality of conveyor units arranged in series and each serving as a product support, the conveyor system comprising first conveyor unit formed by at least one first part conveyor for the reception of the products sliced by means of a slicer;

a second conveyor unit adjoining the first conveyor unit which has a greater width in comparison with a width of the first conveyor unit and whose upstream product support end is movable transversely to the conveyor direction and relative to a downstream product support end of the first conveyor unit;

and a third conveyor unit which is arranged adjoining a stationary downstream product support end of the second conveyor unit.

2. A conveyor system in accordance with claim 1 wherein the first conveyor unit comprises adjoining first and second, upstream and downstream, respectively, successive part conveyor units, a downstream product support end of the downstream second part conveyor unit and an adjoining upstream product support end of the second conveyor unit being movable transversely to a conveying direction of the conveyor units.

3. A conveyor system in accordance with claim 1 comprising first and second, upstream and downstream, respectively, successive part conveyor units, the upstream part conveyor unit being a part of the first conveyor unit and the downstream part conveyor unit forming the second conveyor unit, a downstream product support end of the first part conveyor unit and an adjoining upstream product support end of the second conveyor unit being movable transversely to the conveyor direction.

4. A conveyor system in accordance with claim 3 wherein the downstream product support end of the first part conveyor unit and the upstream product support end of the second conveyor unit are movable in opposite senses.

5. A conveyor system in accordance with claim 3 wherein a width of the first movable part conveyor unit is narrower than a width of the second conveyor unit.

6. A conveyor system in accordance with claim 5 wherein the width of the first movable part conveyor unit is substantially the same as the width of the conveyor unit preceding it; and wherein a width of the second conveyor unit is at least substantially the same as a width of the third conveyor unit.

7. A conveyor system in accordance with claim 1 wherein a width of the first conveyor unit amounts to approximately 40 to 60% of a width of the second conveyor unit.

8. A conveyor system in accordance with claim 1 wherein the conveyor units comprise multi-element strip conveyors.

9. A conveyor system for transferring at least one linear inlet stream of sliced food products to an outlet stream which is laterally offset with respect to the inlet stream, the conveyor comprising a first conveyor for receiving the sliced food products, a second conveyor adjoining the first conveyor, having a width transverse to a conveying direction of the conveyor system which is greater than a width of the first conveyor, an upstream end of the second conveyor receiving sliced food products from a downstream end of the first conveyor and being movable relative thereto in a direction transverse to the conveying direction, a downstream end of the second conveyor being stationary, and a third conveyor for receiving sliced food products from the downstream end of the second conveyor.

* * * * *